COMBINATION OF ELECTROGRAPHY AND MANIFOLD IMAGING

Filed Jan. 9, 1967

INVENTOR.
HAROLD E. CLARK
BY Joseph Hirsch
ATTORNEYS

United States Patent Office 3,573,904
Patented Apr. 6, 1971

3,573,904

COMBINATION OF ELECTROGRAPHY AND MANIFOLD IMAGING

Harold Ernst Clark, Penfield, N.Y., assignor to Xerox Corporation, Rochester, N.Y.

Filed Jan. 9, 1967, Ser. No. 608,157
Int. Cl. G03g *13/22*
U.S. Cl. 96—1 14 Claims

ABSTRACT OF THE DISCLOSURE

An imaging process wherein an imaging layer structurally fracturable in response to the combined effect of an applied electrical field and exposure to actinic electromagnetic radiation is sandwiched between a donor sheet and a receiver at least one of the sheets being at least partially transparent to the actinic electromagnetic radiation. The sandwich is subjected to an imagewise electric field while the imaging layer is uniformly exposed to actinic electromagnetic radiation. Upon separation of the donor sheet and receiver sheet, the imaging layer fractures in imagewise configuration providing a negative image on one of the sheets and a positive image on the other.

The present invention relates in general to imaging and, more specifically, to a novel method for the formation of very high gamma images by layer transfer in image configuration. Further, the invention relates to a novel method for the formation of duplicating masters wherein the receiver sheet is coated with a layer of soluble copy-producing material dispersed throughout a suitable binder material.

Although imaging techniques based on layer transfer of a colored material have been known in the past, these techniques have always been clumsy and difficult to operate because they depend upon photochemical reactions and generally involve the use of distinct layer materials for the two functions of imagewise transfer and image coloration. A typical example of the complex structures and sensitive materials employed in prior art techniques is described in U.S. Pat. 3,091,529 to Buskes. Not only does this type of prior art imaging system tend toward complexity in structure in that it employs separate materials for final image coloration and image-wise transfer but, in addition, image-wise transfer generally depends upon a photo-induced chemical reaction which changes the adherence of the layer so exposed. The effectiveness of this type of photochemical reactions depends, in turn, upon vagaries of catalysts used in this system, temperature, pH and many other factors which influence the speed and effectiveness of chemical reactions in general. Many of the prior art systems employ light-sensitive diazo compounds which are, of course, notoriously slow in their response to light. In addition, because of the complexities and critical nature of prior art systems they are, for the most part, difficult and expensive to prepare in the first instance and then can only be used by trained operators.

In co-pending application Ser. No. 452,641, filed May 3, 1965, now abandoned in favor of continuation-in-part application 708,380, filed Feb. 26, 1968, there is disclosed a new and improved manifold imaging method wherein a layer of a cohesively weak photoresponsive imaging material is deposited upon a suitable substrate. The imaging material is activated by treating it with a swelling agent or partial solvent which serves the dual function of making the top surface of the imaging layer slightly tacky and, simultaneously, weakening it structurally so that it can be fractured more easily along a sharp line which defines the image to be reproduced. The activation step, however, can be eliminated if (1) the layer retains sufficient residual solvent from the coating operation; (2) the imaging layer is sufficiently inherently weak so that it will fracture as desired; or (3) the receiver sheet is coated with a material which, when heated, will flow into the imaging layer and weaken it so that it will fracture in imagewise configuration. Once the imaging layer is activated, a receiver sheet is laid down upon its surface. An electrical field is applied across the manifold set while it is exposed to a pattern of light and shadow representative of the image to be reproduced. Upon separation of the donor substrate from the receiver sheet, the imaging layer fractures along the lines defined by the pattern of light and shadow to which it has been exposed. A portion of the imaging layer is transferred to the receiver sheet while the remainder continues to be adhered to the donor substrate so that a positive image is produced on one support member while a negative is produced on the other.

Accordingly, it is an object of the present invention to provide a high gamma imaging process.

It is a further object of the present invention to provide a high contrast-photographic strip-out process.

A still further object of the present invention is to provide an imaging process for simultaneously producing a positive and a negative.

Yet another object of the present invention is to provide an imaging process for producing a duplicating master.

A still further object of the present invention is to provide an imaging process for simultaneously forming a positive or negative duplicating master and a corresponding negative or positive projection transparency.

A still further object of the present invention is to provide an imaging apparatus for use with an imaging member in the form of a manifold set.

The above and still further objects, features, and advantages of the present invention will become apparent upon consideration of the following detailed disclosure of specific exemplary embodiments of the invention.

The above and still further objects may be accomplished in accordance with the present invention by providing a donor substrate having a cohesively weak photoresponsive imaging material thereon. After activation of the imaging material with an appropriate swelling agent or partial solvent, a receiver sheet is laid down over the exposed surface of the imaging material. The manifold set is then uniformly exposed to electromagnetic radiation while an electric field is applied in imagewise configuration. Upon separation of the donor substrate and the receiver sheet, the weakly photoresponsive imaging material fractures along the lines defined by the imagewise configuration of the electric field with part of the imaging layer being transferred to the receiver sheet while the remainder is retained on the donor substrate. Accordingly, a positive image is produced on one surface while a negative is produced on the other.

In a further embodiment, the receiver sheet is coated on one surface thereof with a uniform layer of a soluble copy-producing material dispersed in a wax or resin binder. For brevity, the coating on the receiver sheet will be called the duplicating layer. After activation of at least one of the imaging material or the duplicating layer with a swelling agent or partial solvent, the coated surfaces of each supporting member are placed in contact with each other whereby a bond is formed between the coated materials. The manifold set is uniformly exposed to electromagnetic radiation during application of an electric field in imagewise configuration. Upon separation of the donor substrate and the receiver sheet, the weakly photoresponsive imaging material fractures along the lines defined by the configuration of the electric field. Because of the bond formed at the interface between the imaging material and the duplicating layer, these latter materials will be transferred as a single unit. Thus, certain portions of the imaging material will be transferred to the receiver sheet and will completely cover the underlying duplicating layer. In the remaining areas, the imaging material will remain adhered to the underlying donor substrate but will be overcoated with the duplicating layer which is stripped away from the receiver sheet. In this manner and depending upon the polarity of the applied field, a positive or negative spirit duplicating master will be produced on the donor substrate and a corresponding negative or positive will be produced upon the receiver sheet. If the receiver sheet is transparent or uniformly translucent it can be used as a projection transparency.

The nature of the invention will be more easily understood when it is considered in conjunction with the accompanying drawings of exemplary preferred embodiments of the invention wherein:

FIG. 1 is a side sectional view of a photosensitive imaging member for use in the invention;

FIGG. 2 is a side sectional view of an alternate embodiment of the photosensitive imaging member having a shaped character in contact therewith;

Figures 1, 2, 3, 4, 4A, 4B, 4C:
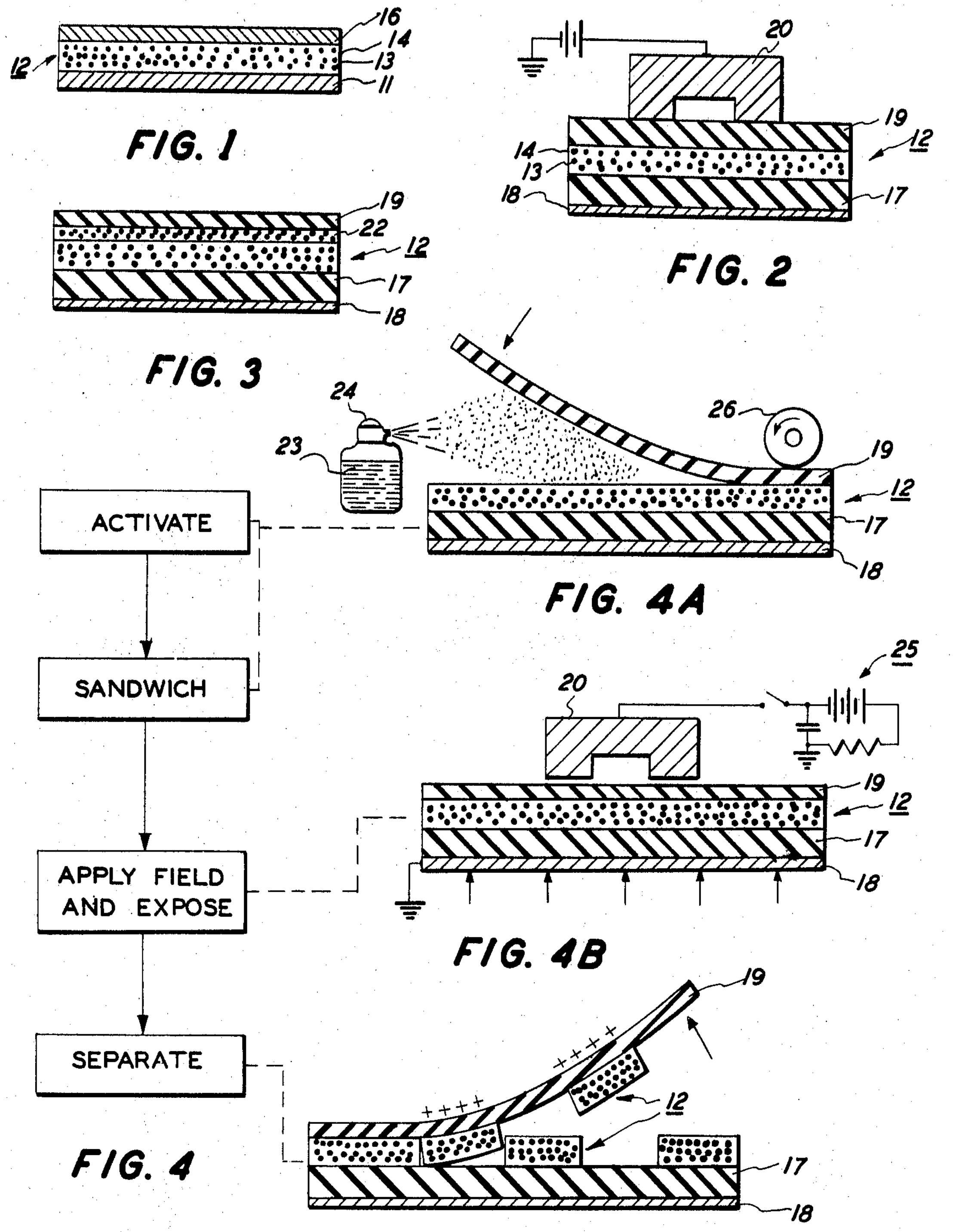
FIG. 3 is a side sectional view of still a further alternate embodiment of the imaging member for use in the present invention.
FIG. 4 is a process flow diagram of the method steps of the present invention; and FIGS. *4a*, *4b*, and *4c* are side sectional views, diagrammatically illustrating the process steps of FIG. 4.

Referring to FIG. 1 there is seen a supporting donor substrate 11 and an imaging layer generally designated 12. In the manufacture of the imaging member, herein referred to as the manifold set, layer 12 is coated on substrate 11 so that it adheres thereto. In this particular illustrative example, layer 12 consists of photoconductive pigment 13 dispersed in a binder 14. This two-phase system has so far been found to constitute a preferred form for imaging layer 12; however, homogeneous layers made up, for example of a single component or a solid solution of two or more components are employed where these layers exhibit the desired photoresponse and have the desired physical properties. The basic physical property desired in layer 12 is that it be frangible, having a relatively low level of cohesive strength either in the as-coated condition or after it has been suitably activated as described more fully hereinafter. Since layer 12 serves as the photoresponsive element of the system as well as the colorant in at least one of the states in which the separated masters will exist, the components of this layer are, in most cases, preferably selected so as to have a high level of photoresponse while, at the same time, being intensely colored so that a high contrast image can be formed by this high gamma system. Thus, for example, in the two-phase system, intensely colored photoresponsive pigments such as phthalocyanine blues, quinacridone reds and the like are preferred. The alpha and X crystalline forms of metal-free phthalocyanine are especially preferred pigments for use in the invention because of their very high sensitivity. The X crystalline form is described in co-pending application Ser. No. 505,723, filed Oct. 29, 1965 by Byrne et al., now U.S. Pat. 3,357,-989, a continuation-in-part application of co-pending application Ser. No. 375,191, filed June 15, 1964, now abandoned. It is to be understood, however, that since the binder itself may be dyed or pigmented with additional colorant in either the single-phase or two-phase system, intense coloration of the photoresponsive material itself, while being preferred, is not critical in any sense even for high contrast imaging. Accordingly, even transparent materials may be used.

Any suitable photoresponsive material may be employed in this system with the choice depending largely upon the photosensitivity required, the spectral sensitivity, the degree of contrast desired in the final image, whether a heterogeneous or a homogeneous system is desired and similar considerations. Typical photoconductors include substituted and unsubstituted phthalocyanine, quinacridones, zinc oxide, mercuric sulfide, Algol yellow (C.I. No. 67,300), cadmium sulfide, cadmium selenide, Indofast brilliant scarlet toner (C.I. No. 71, 140), zinc sulfide, selenium, antimony sulfide, mercuric oxide, indium trisulfide, titanium dioxide, arsenic sulfide, $Pb_3O_4$, gallium triselenide, zinc cadmium sulfide, lead iodide, lead selenide, lead sulfide, lead telluride, lead chromate, gallium telluride, mercuric selenide, and the iodides, sulfides, selenides and tellurides of bismuth, aluminum and molybdenum. Others include the more soluble organic photoconductors (which facilitate the fabrication of homogeneous systems) especially when these are complexed with small amounts (up to about 5%) of suitable Lewis acids. Typical of these organic photoconductors are 4,5-diphenylimidazolidinone;
4,5-diphenylimidazolidinethione;
4,5-bis-(4′-amino-phenyl)-imidazolidinone;
1,5-dicyanonaphthalene;
1,4-dicyanonaphthalene;
aminophthalodinitrile;
nitrophthalidinitrile;
1,2,5,6-tetraazacyclooctatetraene-(2,4,6,8);
3,4-di(4′-methoxy-phenyl-7,8-diphenyl-1,2,5,6-tetraazacyclooctatetraene-(2,4,6,8);
3,4-di-(4′-phenoxy-phenyl-7,8-diphenyl-1,2,5,6-tetraaza-cyclooctatetraene-(2,4,6,8);
3,4,7,8-tetramethoxy-1,2,5,6-tetraaza-cyclooctatetraene-(2,4,6,8);
2-mercaptobenzthiazole;
2-phenyl-4-diphenylidene-oxazolone;
2-phenyl-4-p-methoxy-benzylidene-oxazolone;
6-hydroxy-2-phenyl-3-(p-dimethylamino phenyl)-benzofurane;
6-hydroxy-2,3-di-(p-methoxyphenyl)-benzofurane;
2,3,5,6-tetra-(p-methoxyphenyl)-furo-(3,2f)-benzofurane;
4-dimethylamino-benzylidene-benzhydrazide;
4-dimethylaminobenzylideneisonicotinic acid hydrazide;
furfurylidene-(2)-4′-dimethylamino-benzhydrazide;
5-benzlidene-amino-acenaphthene;
3-benzylidene-amino-carbazole;
(4-N,N-dimethylamino-benzylidene)-p-N,N-dimethyl-aminoaniline;
(2-nitro-benzylidene)-p-bromo-aniline;
N,N-dimethyl-N′-(2-nitro-4-cyano-benzylidene)-p-phenylene-diamine;
2,4-diphenyl-quinazoline;
2-(4′-amino-phenyl)-4-phenyl-quinazoline;
2-phenyl-4-(4′-di-methyl-amino-phenyl)-7-methoxy-quinazoline;
1,3-diphenyl-tetrahydroimidazole;
1,3-di-(4′-chlorophenyl)-tetrahydroimidazole;
1,3-diphenyl-2-(4′-dimethyl amino phenyl)-tetrahydro-imidazole;
1,3-di-(p-tolyl)-2-[quinolyl-(2′-)]-tetrahydroimidazole;
3-(4′-dimethylamino-phenyl)-5-(4″-methoxy-phenyl-6-phenyl-1,2,4-triazine;
3-pyridil-(4′)-5-(4″-dimethylamino-phenyl)-6-phenyl-1,2,4-triazine;
3-(4′-amino-phenyl)-5,6-di-phenyl-1,2,4-triazine;
2,5-bis[4′-amino-phenyl-(1′)]-1,3,4-triazole;
2,5-bis[4′-(N-ethyl-N-acetylamino)-amino)-phenyl-(1′)]-1,3,4-triazole;
1,5-diphenyl-3-methyl-pyrazoline;
1,3,4,5-tetraphenyl-pyrazoline;
1-methyl-2-(3′,4′-dihydroxy-methylene-phenyl)-benz-imidazole;
2-(4′-dimethylamino phenyl)-benzoxazole;
2-(4′-methoxyphenyl)-benzthiazole;
2,5-bis[p-aminophenyl-(1)]-1,3,4-oxadiazole;
4,5-diphenyl-imidazolone;
3-aminocarbazole;

copolymers and mixtures thereof. Any suitable Lewis acid (electron acceptor) may be employed under complexing conditions with many of the aforementioned more soluble organic materials and also with many of the more insoluble organics to impart very important increases in photosensitivity to those materials. Typical Lewis acids are 2,4,7-trinitro-9-fluorenone; 2,4,5,7-tetranitro-9-fluorenone; picric acid; 1,3,5-trinitrobenzene chloranil; benzo-quinone; 2,5-dichlorobenzoquinone; 2-6-dichlorobenzo - quinone; chloranil; naphthoquinone-(1,4); 2,3 - dichloronaphthoquinone-(1,4); anthraquinone; 2-methylanthraquinone; 1, 4-dimethyl-anthra-quinone; 1-chloroanthraquinone; anthraquinone-2-carboxylic acid; 1,5-dichloroanthraquinone; 1-chloro-4-nitroanthraquinone; phenanthrene - quinone; acenaphthenequinone; pyranthrenequinone; chrysene-quinone; thio-naphthene-quinone; anthraquinone-1,8-disulfonic acid and anthraquinone-2-aldehyde; triphthaloylbenzene-aldehydes such as bromal, 4-nitrobenzaldehyde; 2, 6-di-chlorobenzaldehyde-2, ethoxy - 1 - naphthaldehyde; anthracene-9-aldehyde; pyrene-3-aldehyde; oxindole - 2-aldehyde; pyridine-2,6-dialdehyde, biphenyl-4-aldehyde; organic phosponic acids such as 4-chloro-3-nitro-benzene-phosphonic acid; nitrophenols; such as 4-nitrophenol and picric acid; acid anhydrides; for example, acetic-anhydride, succinic anhydride, maleic anhydride; phthalic anhydride, tetrachlorophthalic anhydride; perylene 3,4,9,10-tetracarboxylic acid and chrysens-2,3,8,9-tetracarboxylic anhydride; di-bromo maleic acid anhydride; metal-halides of the metals and metalloids of the Groups I–B, II through to Group VIII of the periodical system, for example: aluminum chloride, zinc chloride, ferric chloride tin tetrachloride, (stannic chloride); arsenic trichloride; stannous chloride; antimony pentachloride, magnesium chloride, magnesium bromide, calcium bromide, calcium iodide, strontium bromide, chromic bromide, manganous chloride, cobaltous chloride, cobaltic chloride, cupric bromide, ceric chloride, thorium chloride; arsenic tri-iodide; boron halide compounds, for examples: boron trifluoride and boron trichloride; and ketones, such as acetophenone benzophenone; 2-acetyl-naphthalene; benzil; benzoin; 5-benzoyl acenaphthene, biacene-dione, 9-acetyl-anthracene, 9-benzoyl-anthracene; 4-(4-dimethylamino-cinnamoyl)-1-acetylbenzene; acetoacetic acid anilide; indandione-(1,3) (1,3-diketo-hydrindene); acenaphthene quinone-dichloride; anisil-2,2-pyridil; furil; mineral acids such as the hydrogen halides, sulphuric acid and phospheric acid; organic carboxylic acids; such as acetic acid and the substitution products thereof; monochloro-acetic acid; dichloro-acetic acid; trichloro-acetic acid; phenylacetic acid; and 6-methyl-coumarinylacetic acid (4); maleic acid, cinnamic acid; benzoic acid; 1-(4-diethyl-amino-benzoyl) - benzene - 2-carboxylic acid; phthalic acid; and tetrachlorophthalic acid; alpha-beta-di-bromo-beta - formyl - acrylic acid (mucobromic acid); dibromo-maleic acid; 2-bromo-benzoic acid; gallic acid; 3-nitro-2-hydroxy-1-benzoic acid; 2-nitro phenoxy-acetic acid, 2-nitro-benzoic acid; 3-nitro benzoic acid; 4-nitro-benzoic acid; 3-nitro-4-ethoxy-benzoic acid; 2-chloro-4-nitro-1-benzoic acid, 2-chloro-4-nitro-1-benzoic acid, 3-nitro-4-methoxy-benzoic acid, 4-nitro-1-methyl-benzoic acid; 2-chloro-4-nitro-1-benzoic acid; 3-chloro-6-nitro-1-benzoic acid; 4-chloro-3-nitro-1-benzoic acid; 4-chloro-3-nitro-2-hydroxy-benzoic acid; 4-chloro-2-hydroxy-benzoic acid; 2,4-dinitro-1-benzoic acid; 2-bromo-5-nitro-benzoic acid; 4-chlorophenyl-acetic acid; 2-chloro-cinnamic acid; 2-cyano-cinnamic acid; 2,4-dichlorobenzoic acid; 3,4-dinitro-benzoic acid; 3,5-dinitro-salicylic acid; malonic acid, mucic acid; acesalicylic acid, benzilic acid; butane-tetra-carbocyclic acid; citric acid; cyano-acetic acid; cyclo-hexane-dicarboxylic acid; cyclo-hexane-carboxylic acid; 9,10-dichloro-stearic acid; fumaric acid; itaconic acid; levulinic acid; (levulic acid); malic acid; succinic acid; alpha-bromo-stearic acid; citraconic acid; dibromo-succinic acid; pyrene-2,3,7,8-tetra-carboxylic acid; tartaric acid; organic sulphonic acid, such as 4-toluene sulphonic acid; and benzene sulphonic acid; 2,4-dinitro-1-methyl-benzene-6-sulphonic acid; 2,6-dinitro-1-hydroxy-benzene-4-sulphonic acid and mixtures thereof.

In addition, other photoconductors may be formed by complexing one or more suitable Lewis acids with polymers which are ordinarily not thought of as photoconductors. Typical polymers which may be complexed in this manner include the following illustrative materials: polyethylene terephthalate, polyamides, polyimides, polycarbonates, polyacrylates, polymethylmethacrylates, polyvinyl fluorides, polyvinyl chlorides, polyvinyl acetates, polystyrene, styrene-butadiene copolymers, polymethacrylates, silicone resins, chlorinated rubber, and mixtures and copolymers thereof where applicable; thermosetting resins such as epoxy resins, phenoxy resins, phenolics, epoxy-phenolic copolymers, epoxy ureaformaldehyde copolymers, epoxy melamine-formaldehyde copolymers and mixtures thereof, where applicable. Other typical resins are epoxy esters, vinyl epoxy resins, tall-oil modified epoxies, and mixtures thereof where applicable.

It is also to be understood in connection with the heterogeneous system, that the photoconductive particles themselves may consist of any suitable one or more of the aforementioned photoconductors either organic or inorganic dispersed in, in solid solution in, or copolymerized with, any suitable insulating resin whether or not the resin itself is photoconductive. This particular type of particle may be particularly desirable to facilitate dispersion of the particle, to prevent undesirable reactions between the binder 14 and the photoconductor or between the photoconductor and the activator and for similar purposes. Typical resins of this type include polyethylene, polypropylene, polyamides, polymethacrylates, polyacrylates, polyacrylates, polyvinyl chlorides, polyvinyl acetates, polystyrene, polysiloxanes, chlorinated rubbers, polyacrylonitrile, epoxies, phenolics, hydrocarbon resins and other natural resins such as rosin derivatives as well as mixtures and copolymers thereof.

The ratio of photoconductor 13 to binder 14 by volume in the heterogeneous system may range from about 10 to 1 to about 1 to 10, but it has generally been found that proportions in the range of from about 1 to 2 to about 2 to 1 produce the best results and, accordingly, this constitutes a preferred range.

As stated above, imaging layer 12 has relatively low cohesive strength either in the as-coated condition or after it has been suitably activated. This, of course, is true for both the homogeneous system and the heterogeneous system. One technique for achieving low cohesive strength in layer 12 is to employ relatively weak, low molecular weight materials therein. Thus, for example, in a single component, homogeneous layer 12, a monomeric compound or a low molecular weight polymer complexed with a Lewis acid to impart a high level of photoresponse to the layer may be employed. Similarly, when a homogeneous layer utilizing two or more components in solid solution is selected to make up layer 12, either one or both of the components of the solid solution may be a low molecular weight material so that the layer has the desired low level of cohesive strength. This approach may also be taken in connection with the heterogeneous layer 12 illustrated in FIG. 1. Although the binder material 14 in the heterogeneous system may in itself be photoresponsive, it does not necessarily have this property so that materials such as microcrystalline wax, paraffin wax, low molecular weight polyethylene and other low molecular weight polymers may be selected for use as this binder material solely on the basis of physical properties and the fact that they are insulating materials without regard to their photoresponse. This is also true of the two-component homogeneous system where non-photoresponsive materials with the desired physical properties can be used in solid solution with the photoresponsive material. Any other technique for achieving low cohesive strength in imaging layer 12 may also be employed. For example, suitable blends of incompatible materials such as a blend of a polysiloxane resin with a polyacrylic ester resin may be used either as binder layer 14 in a heterogeneous system or in conjunction with a "homogeneous" system in which the photoresponsive material may be either one of the incompatible components (complexed with a Lewis acid) or a separate and additional component of the layer. The thickness of imaging layer 12 is not critical and layers from about 0.3 to about 10 microns have been used.

Above imaging layer 12 is a third or receiving layer 16. This receiver sheet is ordinarily supplied as a separate layer which does not initially adhere to layer 12. Accordingly, although the whole imaging member or "manifold set" may be supplied in a convenient three-layer sandwich as shown in FIG. 1, receiving layer 16 may also be supplied as a separate sheet or roll if desired. On the other hand, in those systems where activation of the imaging layer is not required or where imaging layer 12 has been preactivated at the factory, layer 16 may be adhered to or at least tacked onto imaging layer 12. In the particular embodiment of the manifold set, shown in FIG. 1, the donor substrate 11 comprises an electrically conductive material, such as cellophane, and the receiver sheet comprises an insulating layer with at least one of them being optically transparent to provide for the exposure of layer 12. There should be a fairly close balance between the adherence of imaging layer 12 for the donor and receiver layers 11 and 16, respectively, with a slightly stronger adherence to the donor at the time of imaging. Accordingly, layers 11 and 16 should be selected with this in mind. One way to easily accomplish this balance is to use the same material for layer 16 as is used for layer 11.

Although the structure of FIG. 1 represents one of the simplest forms which the manifold set may take, another embodiment is illustrated in FIG. 2 wherein imaging layer 12 may take any one of the forms as described above in connection with FIG. 1. In the FIG. 2 embodiment imaging layer 12 is deposited on an insulating donor substrate 17 which is backed with a conductive electrode layer 18 while the image receiving portion of the manifold set consists of an insulating receiver sheet 19. On the exposed surface of receiver sheet 19 there is a shaped character 20 for applying an electric field in imagewise configuration. Either or both of the pairs of elements 17–18 and 19–20 should be transparent so as to permit exposure of imaging layer 12. Flexible, transparent conductive materials, such as cellophane, which may be used in the FIG. 1 embodiment of the invention, are for the most part relatively weak materials with the choice of these materials being quite limited. The FIG. 2 structure which uses an insulating donor substrate 17 and insulating receiver sheet 19 allows for the use of high strength insulating polymers such as polyethylene, polypropylene, polyethylene terephthalate, cellulose acetate, Saran (vinyl chloride-vinylidene chloride copolymer) and the like. Not only does the use of this type of high strength polymer provide a strong substrate for the positive and negative images formed on the donor substrate and receiver sheet but, in addition, it provides an electrical barrier between the conductive materials 18 and 20 and the imaging layer 12 which tends to inhibit electrical breakdown of the system.

Referring to FIG. 3, there is seen a still further embodideposited on an insulating donor substrate 17 which is ment of the imaging member wherein imaging layer 12 is backed with a conductive electrode layer 18. The remaining portion of the manifold set consists of a duplicating layer 22 deposited on an insulating receiver sheet 19. As shown, layer 22 and imaging material 12 are in face-to-face contact. Either receiver sheet 19 or the pair of layers 17–18 should be transparent to permit exposure of imaging layer 12. Although the entire manifold set may be supplied in the convenient 5-layer sandwich as shown in FIG. 3, the receiver sheet having duplicating layer 22 thereon can be supplied as a separate member which does not initially adhere to layer 12.

Duplicating layer 22 includes a large proportion of a soluble copy-producing material dispersed throughout a suitable binder material. The term "copy-producing material" is intended to include any soluble dye material which, by itself, has a particular color, such as the dyes used in conventional spirit duplicating processes, as well as transferable materials of latent color potential which, when brought in contact with an appropriate reaction partner, produce an intensely colored substance. This intensely colored substance can then be transferred to a copy sheet or, if the reaction partner is coated on a copy sheet, the intensely colored substance will be formed directly thereon. Suitable spirit soluble materials are well known in the art and include, for example, crystal violet, methyl violet, malachite green, nigrosine, magenta, Victoria green, etc. Further suitable copy-producing materials include, for example, the color-forming reaction pairs disclosed in Gundlach et al. 3,170,395 and such disclosure is incorporated herein by reference. The binder for the duplicating layer may comprise any conventional wax or resin binders or mixtures thereof, such as paraffin wax, micro crystalline wax, petrolatum, beeswax, carnauba, ethyl cellulose, or the like. The duplicating layer may be made from a suitable combination of various waxes, resins, oils, and copy-producing materials. The duplicating layer may also contain photoresponsive materials, such as the ones used in layer 12, to cause it to respond in a similar manner when exposed to a pattern of light and shadow. The copy producing material should be of such a nature that it is sufficiently soluble in a duplicating fluid, such as an alcohol mixture, that upon repeated moistening of the duplicating layer with the duplicating fluid, a portion of the copy-producing material will be repeatedly transferred to a plurality of copy sheets in a manner well known to those skilled in the art. Thus, when using a spirit soluble dye, such as crystal violet, a portion of the crystal violet will be transferred to each of the copy sheets until the soluble dye is depleted from the duplicating layer. When using the color reaction partners, a portion of one reaction partner will be transferred from the duplicating layer to the other reaction partner to form the intensely colored substance. Suitable solvents for transferring a portion of the copy-producing material includes water, alcohol, benzene-acetone or the like. Further, upon activation of either the imaging material 12 or the duplicating layer 22 a strong bond should occur at the interface between these two materials when placed in face-to-face contact. Because of this relatively strong bond being formed at the interface, subsequent fracturing of the imaging material and the duplicating layer during exposure and imagewise field application will result in a portion of the imaging material being transferred from the donor substrate to the receiver sheet thereby covering such portions of the duplicating layer which are not simultaneously transferred to the donor substrate. The duplicating layer is stripped away from the receiver sheet and transferred, as an overcoating, to the nontransferred portions of the imaging material supported by the underlying donor substrate. The donor substrate with the overcoating of duplicating layer bonded to the imaging material is the duplicating master of the present invention. Whether the duplicating master is a positive or negative of the original will depend on the photosensitive materials employed in the imaging layer 12 as well as the polarity of the applied field, as will be discussed hereinafter.

There should be a fairly close balance between the adherence of imaging layer 12 to the donor substrate 11 and the duplicating layer 22 to receiver sheet 19 with, preferably, a slightly stronger adherence of the imaging layer to the donor substrate at the time of imaging. One way to easily accomplish this balance is to use the same material for sheet 19 as is used for substrate 11. As previously noted, upon activation of either the imaging material or the duplicating layer a strong bond, either adhesive or cohesive, should occur at the interface between the two materials when they are placed in face-to-face contact. This is most easily achieved by utilizing the same binder for the duplicating layer as for the imaging material. Suitable binders include paraffin wax and microcrystalline wax. Upon activation, these waxes form a strong cohesive interfacial bond resulting in a distinct two-layer material which will fracture easily during the application of an imagewise electric field and uniform exposure to electromagnetic radiation.

The duplicating layer of FIG. 3 on the receiver sheet can be overcoated with a thin layer of binder material utilized in the preparation of imaging layer 12. After activation of either layer, the manifold set is processed as previously described with the result that a portion of the duplicating layer is transferred from the receiver sheet to the donor substrate. It is advantageous to use this overcoating when using a different binder material for duplicating layer 22 than that used for imaging material 12 and where the adhesive interfacial forces are not sufficient to bond the two layers together. Thus, by providing a receiving sheet as described above, a relatively strong cohesive bond will be created during imaging between the overcoating and the imaging layer 12. Optionaly, the thin layer of binder material can contain a quantity of photoresponsive pigments and thus be similar in composition to imaging layer 12. Additionally, the thin coating on the receiver sheet protects the duplicating layer from leaching during the activation operation in the event that the activator is a solvent for the dye contained within the duplicating layer.

Referring now to the flow diagram of FIG. 4, it is seen that the first step in the imaging process is the activation step. In this stage of the imaging process, the manifold set is opened and the activator is applied to imaging layer 12 following which the outer sheets of the manifold set are closed, as indicated in the right hand portion of FIG. 4*a*. Although the activator may be applied by any suitable technique, such as with a brush, with a smooth or rough surfaced roller, by flow coating, by vapor condensation or the like, FIG. 4*a* which diagrammatically ilustrates the first two process steps shows the activator fluid 23 being sprayed on to imaging layer 12 of the manifold set from a container 24. Following the deposition of this activator fluid, the set is closed by a roller 26 which also serves to squeegee out any excess activator fluid which may have been deposited. The activator serves to create an adhesive bond between imaging layer 12 and the receiver sheet as well as to weaken the cohesive strength of imaging layer 12. The activator should also have a high level of resistivity so no electrically conductive paths will be provided through the imaging layer and, in addition, so the imaging layer will support the electrical field which is applied thereto during exposure. Accordingly, it will generally be found desirable to purify commercial grades of activators to remove impurities which might impart a higher level of conductivity to the activating fluids. This may be accomplished by running the fluids through a clay column or by any other suitable purification techniques. Generally, speaking, the activator may consist of any suitable solvent having the aforementioned properties and which have the abovedescribed effect on the imaging layer. For purposes of this specification and the appended claims, the term solvent shall be understood to include not only materials which are conventionally thought of as solvents but also those which are thought of as partial solvents, swelling agents or softening agents for the imaging layer. It is generally preferable that the activator solvents have a relatively low boiling point so that fixing can be accomplished after image formation by solvent evaporation with mild heating at most. It is to be understood, however, that the invention is not limited to the use of these relatively volatile activators. In fact, very high boiling point non-volatile activators including silicone oils such as dimethyl-polysiloxanes and very high boiling point long chain aliphatic hydrocarbon oils ordinarily used as transformer oils, such as Wemco-C transformer oil available from Westinghouse Electric Co., have been successfully utilized in the imaging process. Although these less volatile activators do not dry off by evaporation, image fixing can be accomplished by rolling off the final image produced on an absorbent sheet such as paper which soaks up the activator fluid. In short, any suitable volatile or non-volatile "solvent" activator may be employed. Typical solvents include Sohio odorless solvent 3440, an alpihatic (kerosene) hydrocarbon fraction. available from Standard Oil Company of Ohio, carbon tetrachloride petroleum ether, Freon 214 (tetrafluorotetrachloropropane), other halogenated hydrocarbons such as chloroform, methylene chloride, trichloroethylene, perchloroethylene, chlorobenzene, trichloromonofluoromethane, tetrachlorodifluoroethane, trichlorotrifluoroethane, amides such as formamide, dimethyl formamide, esters such as ethyl acetate, isopropyl acetate, butyl acetate, amyl acetate, cyclohexyl acetate, isobutyl propionate and butyl lactate, ethers such as diethyl ether, diisopropyl ether, dioxane, tetrahydrofuran, ethyleneglycol monoethyl ether, aromatic and aliphatic hydrocarbons such as benzene, toluene, xylene, hexane, cyclohexane, gasoline, mineral spirits and white mineral oil, ketones such as acetone, methyl ethyl ketone, methyl isobutyl ketone and cyclohexanone and vegetable oils such as coconut oil, babussu oil, palm oil, olive oil, castor oil, peanut oil and neatsfoot oil and mixtures thereof.

In certain instances, the first two steps of the imaging process as diagrammatically illustrated in FIG. 4*a*, may be omitted. Thus, for example, a manifold set which is preactivated at the factory may be supplied or if the imaging layer is initially fabricated to have a low enough cohesive strength, activation may be omitted and the receiving sheet 16 may be adhered to the surface of the imaging layer at the time when the latter layer is coated on the donor substrate. It is generally preferable, however, to include an activation step in the imaging process because if this step is included, then a stronger and more permanent imaging layer will be provided which can withstand storage and transportation prior to imaging and which will provide a more permanent final image.

Once the proper physical properties have been imparted to the imaging layer and the receiving sheet 16 has been adhered to its upper surface, an electrical field in imagewise configuration is applied across the manifold set as it is uniformly exposed to electromagnetic radiation, as shown in FIG. 4*b*. The imagewise electric field is applied by a technique called TESI printing, described hereinafter, which uses a shaped character 20 and a discharge generating circuit 25. Upon separation as shown in FIG. 4*c* of the donor substrate and the receiving sheet, imaging layer 12 fractures along the lines defined by the configuration of the electric field and at the surface where it is adhered to either the donor substrate or the receiving sheet. Accordingly, once separation is complete, portions of the imaging layer are retained on one of donor substrate and the receiver sheet while the remaining portions are retained on the other support resulting in the simultaneous formation of a high gamma positive image on one of those sheets and a high gamma negative on the other. Whether the portions are retained on the donor substrate or transferred to the receiver sheet depends on the particular photoresponsive material employed in the imaging layer as well as the polarity of the applied field. By making the initial degree of adherence of the imaging layer only slightly higher for the donor substrate then for the receiver sheet, the imaging layer is finally retained on the donor substrate unless the combined effect of exposure and the applied field are added to the bond strength between the imaging layer and the receiver sheet, thereby exceeding the strength of the bond between the imaging layer and the donor substrate. In this way, an amplification effect is achieved and transfer may be caused with relatively low levels of uniform light exposure.

In those instances when a duplicating layer is coated onto the receiver sheet, the activator serves to create an interfacial bond between the imaging layer and the duplicating layer as well as to weaken the cohesive strength of the combined layers 12 and 22. That is, an interfacial bond is formed which is parallel to the surfaces of the donor substrate and the receiving sheet while the cohesive strength along lines perpendicular to these surfaces is lowered. Upon separation after application of an electric field in imagewise configuration and uniform exposure to electromagnetic radiation, portions of the imaging layer having an overcoating of duplicating layer are retained on donor substrate while the remaining portions adhere to the receiver sheet, through the duplicating layer, resulting in the simultaneous formation of a high gamma positive image on one of the supporting members and a high gamma negative on the other. The supporting member having the duplicating layer overcoating will be the duplicating master of the present invention. As previously indicated, whether portions are retained on the donor substrate or the receiver sheet will depend on the particular photoresponsive material employed in the imaging layer as well as the polarity of the applied field.

The essential feature of the present invention is that the electric field is applied in imagewise configuration while the manifold set is uniformly exposed to electromagnetic radiation. The application of the imagewise electric field can be achieved in any suitable manner. One suitable manner for achieving this result is by providing a shaped conducting character positioned adjacent an insulating layer, such as the exposed side of the receiver sheet as in FIG. 2, and applying voltage of sufficient magnitude thereto. Since both electric field and electromagnetic radiation are applied, the cohesively weak photoresponsive imaging layer will fracture along the lines defined by the imagewise electric field during separation.

Other suitable methods include those where electrostatic charge patterns are placed on one of the insulating layers of the manifold set. Normally, such charge patterns would be placed on the exposed surface of the receiver sheet which is on the opposite side of the imaging layer from the donor substrate having the transparent conductive backing. A transferred electrostatic image of sufficient magnitude functions as the imagewise electric field in accordance with the teachings of the present invention. Techniques for forming an electrostatic image on a surface of a dielectric or insulating material are shown in the patents to Walkup U.S. Nos. 2,825,814; 2,833,648; and 2,937,948; which are incorporated herein by reference. In particular, FIG. 2 of the first reference, FIG. 5 of the second reference, and FIG. 3 of the third reference and, of course, the discussions related thereto describe techniques for forming an electrostatic image on a web of insulating material. After creation of the electrostatic image and, of course, omitting development thereof the insulating material is placed in contact with the remainder of the manifold set and uniformly exposed to electromagnetic radiation. Upon separation, portions of the imaging layer will remain adhered to the donor substrate while other portions will be transferred to the insulating web (i.e. the receiver sheet). Though the insulating material is shown as a continuous web in the Walkup patents, it should be apparent that individual sheets of insulating material may be substituted therefor. Further, it should be apparent that the charge retaining surface of the insulating material is so positioned that it is not contacted by the imaging layer but remains as one of the exposed sides of the manifold set.

A further technique for creating the imagewise electric field necessary in the operation of the present invention is shown in the patents to Schwertz Nos. 2,919,967; 3,060,432; and 3,064,259. In this technique, known as TESI (Transfer of Electro Static Images)-printing, electrostatic images are produced by shaped characters or electrode elements which are brought in close proximity to an insulating surface, such as donor substrate or the receiver sheet. A static bias voltage is applied to the insulating surface to bring the applied field to the point of incipient breakdown. Transfer of an electrostatic image, conforming to the configuration of the shaped character, from the shaped character to the insulating surface is effected by the use of a relatively low potential triggering pulse which raises the electric field above the critical stress value, as defined in either of the last two of the aforementioned Schwertz patents, to produce a field discharge in the space between the insulating surface and the electrode. This discharge action gives rise to the formation of an electrostatic pattern, corresponding to the pattern of shaped character, on the insulating surface. The manifold set having the electrostatic image on an insulating surface thereof is uniformly exposed to electromagnetic radiation which will cause the imaging layer, upon separation, to fracture in imagewise configuration. Uniform exposure can be simultaneous with the formation of the electrostatic image or can be at any time prior to deterioration of the image which would prevent fracture of the imaging layer. As an alternate form of this method for creating the electrostatic image which functions as the imagewise electric field, the insulating material can be prestressed by an intense electric field to a point somewhat below the critical stress value. This is more clearly shown in FIG. 6 of each of the last two of the aforementioned Schwertz patents and, in general, is more applicable to instances where the electrostatic image is created on the insulating material prior to the time when it is positioned as an element of the manifold set.

Any size or shape character may be utilized to provide the imagewise configuration of the electric field. Suitable character including for example, alpha-numeric characters, as shown in the patents to Schwertz, or intricately designed electrodes of large size. Pin matrices, such as shown by Schwertz in U.S. 3,023,731 whether having a curved or planar surface, may also be used in the practice of the present invention.

Exposure of the imaging layer is one of the essential features of the present invention. Accordingly, the manifold set should be so constructed that the imaging layer can be exposed, when desired, to actinic electromagnetic radiation. This is most easily achieved by providing a transparent receiver sheet and/or a transparent donor substrate, at least one of these layers having a transparent conductive backing thereon while the other is an insulating material. It is not necessary, of course, that both sides of the imaging layer be transparent, it being sufficient if only the layers between the imaging layer and the radiation source are transparent. Further, shaped characters of glass having a conductive coating, such as tin oxide, can be used to permit exposure through the shaped character and the insulating material adjacent thereto.

Field strengths in the range of about 500 to about 4,000 volts per mil of thickness across the manifold set have been used to produce suitable images; however, the preferred field strength is on the order of about 1,000–2,000 volts per mil. Knowing the thickness of the manifold set, the voltage to be applied to achieve the desired electric field can be easily calculated.

A visible light source, an ultra-violet light source or any other suitable source of actinic electromagnetic radiation may be used to expose the manifold set. Better quality images are produced by exposing from the donor side of the imaging layer, and, accordingly, the receiver sheet is usually separated from the other layers of the manifold set just after exposure. Short delays in separation after the exposure step seem to have no deleterious effects on the images produced; however, to obtain better quality images, it is best to separate the layers as soon as possible after exposure.

If a relatively volatile activator is employed, such as petroleum ether or carbon tetrachloride, fixing of the image on the receiver sheet occurs almost instantaneously after separation of the layer because the relatively small quantity of activator in the 2–5 micron layer of imaging material flashes off very rapidly. With somewhat less volatile activators, such as the Sohio odorless solvent 3440 or Freon 214, described above, fixing may be accelerated by blowing air over the images or warming them to about 150° F., whereas with the even less volatile activators, such as transformer oil, fixing is accomplished by absorption of the activator into another layer such as as paper substrate to which the image is transferred. Many other fixing techniques and methods for protecting the images such as overcoating, laminating with a transparent thermoplastic sheet and the like will occur to those skilled in the art. Increased image durability and hardness may also be achieved by treatment with an image material hardening agent or with a hard polymer solution which will wet the image material but not the donor substrate.

In general, the apparatus for carrying out the imaging procedure described above will employ the elements illustrated in FIGS. 4*a*, 4*b* and 4*c* including means to apply activator fluid, a squeegee roller to remove excess activator fluid, means to apply an electric field in imagewise configuration across the manifold set, exposure means, and means to separate the donor substrate and receiver sheet after imaging. Opening the manifold set for activation, closing the set for exposure and opening again for separation and image formation may be accomplished by any one of a number of techniques which will be obvious to those skilled in the art. One straight-forward way to accomplish this result is to supply the imaging materials in the form of long webs which can be entrained over rollers so as to provide openings and closing of the set during the imaging process.

It should be noted that the manifold sets may be supplied in any color desired either by taking advantage of the natural color of the photoresponsive or binder materials in the imaging layer of the manifold set or by the use of additional dyes and pigments therein whether photoresponsive or not, and, of course, various combinations of these photoresponsive and non-photoresponsive colorants may be used in the imaging layer so as to produce the desired color. Although manifold images are in the form of transparencies when first produced, these images may be laminated with opaque backing material of various contrasting colors to produce prints. In addition, manifold images using different colored imaging layers such as cyan, magenta and yellow may be combined to produce full natural color images by super position of transparencies. It is also to be noted that different photoresponsive materials have different spectral responses and that the spectral response of many photoresponsive materials may be modified by disensitization so as to either increase and narrow the spectral response of a material to a peak or to broaden it to make it more panchromatic in its response. Thus, the material can be used to make ordinary "black and white" images using panchromatic response while narrow spectral response materials may be employed for the production of color separations or the like.

The spirit duplicating master of the present invention will be used in a manner well known to those skilled in the art. In general, the master is repeatedly brought into surface contact with copy sheets which have been moistened with a solvent for the dye material. A portion of the dye within the spirit duplicating layer will be dissolved in the solvent, leached from that layer and transferred from the master to the copy sheet to form the copy. As is known, a substantial number of copies can be made from the master before the dye is totally consumed. Under normal spirit duplicating applications, the master is then discarded as it is no longer capable of being utilized to produce additional copies. An additional advantage of the present invention is that the master, after the spirit duplicating copies have been run therefrom, is still opaque in image areas and can be used as a projection transparency. Whether this transparency will either be a positive or negative will depend upon the manner in which the master was produced.

The color reaction-pair duplicating master of the present invention will be used in a manner similar to that described above with respect to a spirit duplicating master. That is, in general, the master is repeatedly brought into surface contact with a plurality of copy sheets which have been moistened with a solvent for the reaction partner held on the surface of the master. A portion of the reaction partner within the duplicating layer will be dissolved in the solvent, leached from that layer and transferred from the master to the copy sheet to form the intensely colored substance in image-wise configuration. As with the spirit duplicating master, once the master is no longer capable of producing additional copies of high quality, the master can be used as a projection transparency.

The following examples are given to enable those skilled in the art to more clearly understand and practice the invention. They should not be considered as a limitation upon the scope of the invention but merely as being illustrative thereof.

EXAMPLE I

A 2 mil thick polyethylene terephthalate donor substrate is coated in subdued light with a uniform 5 micron thick coating of metal free phthalocyanine in a microcrystalline wax (Sunoco 1290) having a melting point of 178° F. The ratio of phthalocyanine pigment to wax binder is approximately 1:1. The coating on the donor substrate is heated to about 140° F. in darkness in order to dry it. The coated donor substrate is placed on a tin oxide surface of a NESA glass plate with its phthalocyanine coating facing away from the tin oixde. A 2 mil thick polyethylene terephthalate receiving sheet is placed on the coated surface of the donor substrate. The receiver sheet is lifted up and the phthalocyanine-wax layer is activated with one quick brush stroke of a wide camel's hair brush saturated with petroleum ether. The receiver sheet is then replaced in its initial position and a roller is rolled slowly once over the closed manifold set with light pressure to remove excess petroleum ether. With the NESA glass coating connected to ground, a shaped character is positioned on the exposed surface of the receiver sheet. Voltage of approximately 2,000 volts is applied to the shaped character as the imaging layer is uniformly exposed to a white incandescent light source of approximately 1/10 foot candle through the NESA glass for about 5 seconds. After application of the field and exposure to the electromagnetic radiation, the receiver sheet is stripped away from the imaging layer. This separation yields a duplicate of the original on the receiver sheet, the image areas comprising phthalocyanine dispersed in the wax binder which has been transferred from the donor substrate to the receiver sheet. Simultaneously during separation, a reversal of the original is formed on the donor substrate. The small amount of petroleum ether present evaporates within a second or two after separation and fixes each portion of the imaging layer to its underlying support.

EXAMPLE II

A 2 mil thick polyethylene terephthalate receiving sheet is coated with a uniform spirit duplicating layer of crystal violet dispersed throughout a microcrystalline wax (Sunoco 1290). The coating is 5 microns thick and contains approximately 25% crystal violet by weight. A 5 micron thick uniform coating of the metal free phthalocyanine in a microcrystalline wax (also Sunoco 1290) is deposited in subdued light upon a 2 mil thick polyethylene terephthalate sheet. The ratio of phthalocyanine pigment to wax binder is approximately 1:1. The coating on the donor substrate is heated to about 140° F. in darkness in order to dry it. The coated donor substrate is placed on the tin oxide surface of a NESA glass plate with its phthalocyanine coating facing away from the tin oxide. The crystal violet coated receiver sheet is placed on the coated surface of the donor substrate. The receiver sheet is lifted up and the phthalocyanine wax-imaging layer is activated with petroleum ether. The receiver sheet is replaced in its initial position and a roller is rolled slowly once over the close manifold set with light pressure to remove excess petroleum ether. With the NESA glass connected to ground, a shaped character is placed on the exposed surface of the receiver sheet and, during uniform exposure to a white incandescent light source, voltage of 2,000 volts is applied to the shaped character. The receiver sheet is stripped away from the remainder of the manifold set yielding, on the donor substrate, a reversal duplicating master or projection transparency, the reversal areas comprising a microcrystalline wax binder with phthalocyanine dispersed therein overcoated with a duplicating layer of crystal violet dispersed throughout its microcrystalline wax binder. A substantial number of excellent spirit duplicating copies were made from this master, in accordance with procedures previously described, before the quality of images obtained deteriorated. The master was then placed in a projector and utilized as a projection transparency, the opaque areas of phthalocyanine pigment dispersed in the wax binder preventing passage of the projected light. Simultaneous with the separation of the receiver sheet from the donor substrate, a duplicate of the original is produced on the receiver sheet. The duplicate transparency has crystal violet dispersed throughout the microcrystalline wax binder overcoated with a layer of phthalocyanine also dispersed in a microcrystalline wax binder. The small amount of petroleum ether present evaporates within a second or two after separation thereby fixing the respective images to their underlying supports.

EXAMPLE III

A 5 micron thick uniform coating of the metal free phthalocyanine in a microcrystalline wax binder (Sunoco 1290) is deposited in a subdued light upon a 2 mil thick Mylar sheet. The ratio of phthalocyanine pigment to wax binder is approximately 1:1. The coating on the donor substrate is heated to about 140° F. in darkness in order to dry it. The coated donor substrate is placed on a tin oxide surface of a NESA glass plate with the phthalocyanine coating facing away from the tin oxide. In accordance with the teachings of the aforementioned Walkup patents, a latent electrostatic image is formed on a 2 mil thick polyethylene terephthalate insulating web which is drawn into contact with the exposed surface of the imaging layer immediately after activation of that layer with petroleum ether; the latent electrostatic image being on the opposite side of the insulating web from the imaging layer. In this configuration and with the tin oxide connected to ground, the manifold set is uniformly exposed to a white incandescent light source whereafter the insulating web is stripped away from the remainder of the manifold set. A reversal transparency is formed on the donor substrate simultaneous with the production of a duplicate original on the insulating web. The respective images are immediately fixed on their supports as the small amount of petroleum ether evaporates.

EXAMPLE IV

A 5 micron thick uniform coating of the metal free phthalocyanine in a microcrystalline wax binder (Sunoco 1290) is deposited upon a 2 mil thick polyethylene terephthalate sheet. The ratio of phthalocyanine pigment to wax binder is approximately 1:1. The coating on the donor substrate is heated to about 140° F. in darkness and in order to dry it. The coated donor substrate is placed on the tin oxide surface of a NESA glass plate with the insulating sheet in contact with the tin oxide. The tin oxide conductive layer is connected to ground. A latent electrostatic image is formed on an insulating web in accordance with the aforementioned Schwertz patents and the image carrying web is brought into contact with the exposed imaging layer, immediately after activation of that layer with petroleum ether; the latent electrostatic image being on the opposite side of the insulating web from the imaging layer. The manifold set is uniformly exposed to a white incandescent light source and the insulating web is peeled away from the remainder of the set. A reversal transparency is formed on the donor substrate simultaneous with the production of a duplicate original transparency on the insulating web. Evaporation of the small amount of petroleum ether present from the imaging layer fixes each portion of that material to its respective supports.

EXAMPLES V–VIII

The procedure of Example I is followed except different pigments are used in the preparation of the imaging layer. In Example V, Algol yellow GC Color Index No. 67,300 (1,2,5,6-di(C,C′ diphenyl)-triazolee-anthraquinone is used as the pigment; in Example VI, the pigment is 2,9-dimethylquinacridone; in Example VII, the pigment is mercuric sulfide; and in Example VIII, the pigment is zinc oxide. Exposures on the order of about 500 to about 10,000 foot candle-seconds are required for imaging and, upon separation, a duplicate original (corresponding to the configuration of the electric field) is formed on one substrate while a reversal of the original is formed on the remaining substrate.

The main characterizing property of the system is that it is essentially a go or no go system, so that the imaging layer either stays on the donor substrate or transfers to the receiver sheet. When a duplicating master is produced, this main characterizing property is realized in that (1) the imaging layer either stays on the donor substrate or transfers to the duplicating layer on the receiving sheet and (2) the duplicating layer either stays on the receiver sheet (and is coated by the imaging layer) or transfers to the donor substrate (and coats the remaining portions of the imaging layer). Thus, there is the simultaneous production of a duplicating master and a raised relief image which can be used, for example, as a projection transparency.

While the invention has been described with reference to preferred embodiments thereof, it will be understood by those skilled in the art that various changes in the form and details may be made without departing from the true spirit and scope of the invention. Further, provided the advantageous results of this invention are not adversely affected, additional operations may be formed to achieve the herein disclosed results, or in certain circumstances, certain operations may be deleted as will be apparent to adapt a particular situation or material to the teachings of the herein disclosed invention. All such additions, deletions, modifications, etc. are considered to be within the scope of the present invention.

What is claimed is:

1. A method of imaging comprising providing an imaging member having a photoresponsive imaging layer sandwiched between a donor substrate and a receiver sheet, said layer being structurally fracturable in response to the combined effect of an applied electrical field and exposure to actinic electromagnetic radiation, at least one of the donor substrate and the receiver sheet being at least partially transparent to electromagnetic radiation which is actinic to the imaging layer; uniformly exposing the imaging member to electromagnetic radiation actinic to the photoresponsive layer; simultaneously applying an imagewise electric field across the imaging member; and separating the donor substrate from the receiver sheet.

2. The method of claim 1 wherein the electric field is applied in imagewise configuration through use of a shaped electrode.

3. The method of claim 1 wherein the electric field is applied in imagewise configuration by forming an electrostatic image on the exposed surface of one of the donor substrate and the receiver sheet.

4. The method of claim 1 further including the step of rendering said imaging layer structurally fracturable by applying an activating amount of an activator to the imaging layer prior to exposure and field application, said activator being selected from the group consisting of at least partial solvents, swelling agents, and softening agents.

5. The method of claim 4 wherein the activator is a volatile liquid.

6. The method of claim 1 wherein the structural fracturable photoresponsive imaging layer includes metal-free phthalocyanine in a binder.

7. The method of claim 1 wherein the imaging member further includes a duplicating layer comprising (a) a color producing material selected from the group consisting of soluble dyes and latent color forming reaction partners and (b) a binder, coated onto the receiver sheet, the photoresponsive imaging layer and the duplicating layer being in face-to-face contact.

8. The method of claim 7 wherein the duplicating layer comprises a spirit soluble dye dispersed throughout a binder material.

9. The method of claim 8 wherein the spirit soluble dye is a water soluble dye.

10. The method of claim 8 wherein the spirit soluble dye is an alcohol soluble dye.

11. The method of claim 7 wherein the duplicating layer comprises a latent color forming reaction partner dispersed throughout a binder material, said latent color forming reaction partner reacting with a reaction partner on a copy sheet to produce an intensely colored substance.

12. The method of claim 7 wherein the duplicating layer contains a particulate photoresponsive material.

13. A method of imaging comprising providing an imaging member having a photoresponsive imaging layer sandwiched between two insulating layers, said layers being structurally fracturable in response to the combined effect of an applied electrical field and exposure to actinic electromagnetic radiation at least one of the insulating layers being transparent to electromagnetic radiation actinic to the imaging layer; uniformly exposing the imaging member to electromagnetic radiation actinic to the photoresponsive layer; simultaneously applying an electric field in imagewise configuration across the imaging member; and separating one of the insulating layers from the other of the insulating layers.

14. A method of imaging comprising providing a donor substrate having an overcoating of a dispersion of a particulate photoresponsive material within an insulating binder, applying an activator to said overcoating on said donor substrate to render said overcoating structurally fracturable in response to the combined effect of an applied electric field and exposure to actinic electromagnetic radiation, said activator being selected from the group consisting of at least partial solvents, swelling agents, and softening agents, placing an insulating web over said donor substrate, uniformly exposing the imaging member to electromagnetic radiation actinic to the photoresponsive material, simultaneously applying an electric field in imagewise configuration across the imaging member, and separating the donor substrate from the insulating web whereby the imaging layer fractures in imagewise configuration defined by the configurations of the electric field and a portion of the imaging layer is transferred from the donor substrate to the insulating web.

References Cited

UNITED STATES PATENTS

| | | | |
|---|---|---|---|
| 2,940,847 | 6/1960 | Kaprelian | 96—1 |
| 3,268,331 | 8/1966 | Harper | 96—1 |
| 3,316,088 | 4/1967 | Schaffert | 96—1 |
| 3,384,566 | 5/1968 | Clark | 204—181 |
| 3,438,772 | 4/1969 | Gundlach | 96—1 |

GEORGE F. LESMES, Primary Examiner

J. C. COOPER III, Assistant Examiner

U.S. Cl. X.R.

96—1,3, 27; 204—181, 180